(12) United States Patent
Chao

(10) Patent No.: US 6,382,482 B1
(45) Date of Patent: May 7, 2002

(54) ASSEMBLY OF MAGNETICALLY ATTRACTED EYEGLASS CASE AND CASE SEAT

(76) Inventor: David Yinkai Chao, 1120 Green Acre Rd., Towson, MD (US) 21204

( * ) Notice: Subject to any disclaimer, the term of this patent is extended or adjusted under 35 U.S.C. 154(b) by 0 days.

(21) Appl. No.: 09/767,779

(22) Filed: Jan. 23, 2001

(30) Foreign Application Priority Data

Jan. 3, 2001 (TW) ........................................ 090200090

(51) Int. Cl.[7] ................................................. B60R 7/05
(52) U.S. Cl. ...................... 224/312; 224/183; 224/547; 224/562; 206/5; 206/818; 248/206.5; 248/309.4; 248/683
(58) Field of Search ................................ 224/183, 665, 224/312, 547, 562; 206/5, 6, 818; 248/309.4, 206.5, 683

(56) References Cited

U.S. PATENT DOCUMENTS

| | | | | |
|---|---|---|---|---|
| 2,735,597 A | * | 2/1956 | Treleven ........................ 206/5 |
| 3,741,376 A | * | 6/1973 | Brown et al. .................. 206/37 |
| 4,290,522 A | * | 9/1981 | Takasaki ...................... 206/233 |
| 4,452,354 A | * | 6/1984 | Tabachnick ...................... 206/5 |
| 4,715,575 A | * | 12/1987 | Kamerer ...................... 211/85.1 |
| 5,372,345 A | * | 12/1994 | Schmidt ...................... 224/312 |
| 5,899,371 A | * | 5/1999 | Weliver ...................... 150/112 |
| 6,135,408 A | * | 10/2000 | Richter ........................ 224/183 |
| 6,199,218 B1 | * | 3/2001 | Michael ......................... 2/247 |
| 6,305,656 B1 | * | 10/2001 | Wemyss ......................... 206/5 |

* cited by examiner

*Primary Examiner*—Stephen K. Cronin
(74) *Attorney, Agent, or Firm*—Harness, Dickey & Pierce, P.L.C.

(57) ABSTRACT

An eyeglass case assembly includes an eyeglass case and a case seat. The eyeglass case has a coupling portion with a first magnetic member attached thereto. The case seat has a face which is disposed adjacent to the coupling portion of the eyeglass case and which is provided with a second magnetic member that is attached thereto and that attracts magnetically with the first magnetic member, thereby fixing the eyeglass case to the case seat. The case seat further includes a clamping device which is adapted to hold a sun visor thereon, thereby mounting the case seat fixedly on the sun visor.

9 Claims, 5 Drawing Sheets

ASSEMBLY OF MAGNETICALLY ATTRACTED EYEGLASS CASE AND CASE SEAT

BACKGROUND OF THE INVENTION

1. Field of the Invention

This invention relates to an assembly of an eyeglass case and a case seat which is adapted to be attached to an article, such as a sun visor in a car, and more particularly to an assembly of an eyeglass seat and a case seat which are magnetically attracted to each other.

2. Description of the Related Art

When driving a car, it is necessary for the eyes of the driver to be protected from exposure to bright sunlight, such as by wearing a pair of sunglasses. When the sunglasses are not in use during driving, they are preferably put at a safe and easily accessible place. A conventional eyeglass case, however, cannot be fixed at such a place in the car. As such, the driver may have to take time to look for the same, thereby resulting in inconvenience to the driver.

SUMMARY OF THE INVENTION

The object of this invention is to provide an assembly of an eyeglass case and a case seat which is attracted magnetically to the eyeglass case and which is mounted removably on a sun visor in a car.

According to this invention, an eyeglass case assembly includes an eyeglass case and a case seat. The eyeglass case has a coupling portion with a first magnetic member attached thereto. The case seat has a face which is disposed adjacent to the coupling portion of the eyeglass case and which is provided with a second magnetic member that is attached thereto and that attracts magnetically with the first magnetic member, thereby fixing the eyeglass case to the case seat. The case seat further includes a clamping device which is adapted to hold a sun visor thereon, thereby mounting the case seat fixedly on the sun visor.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
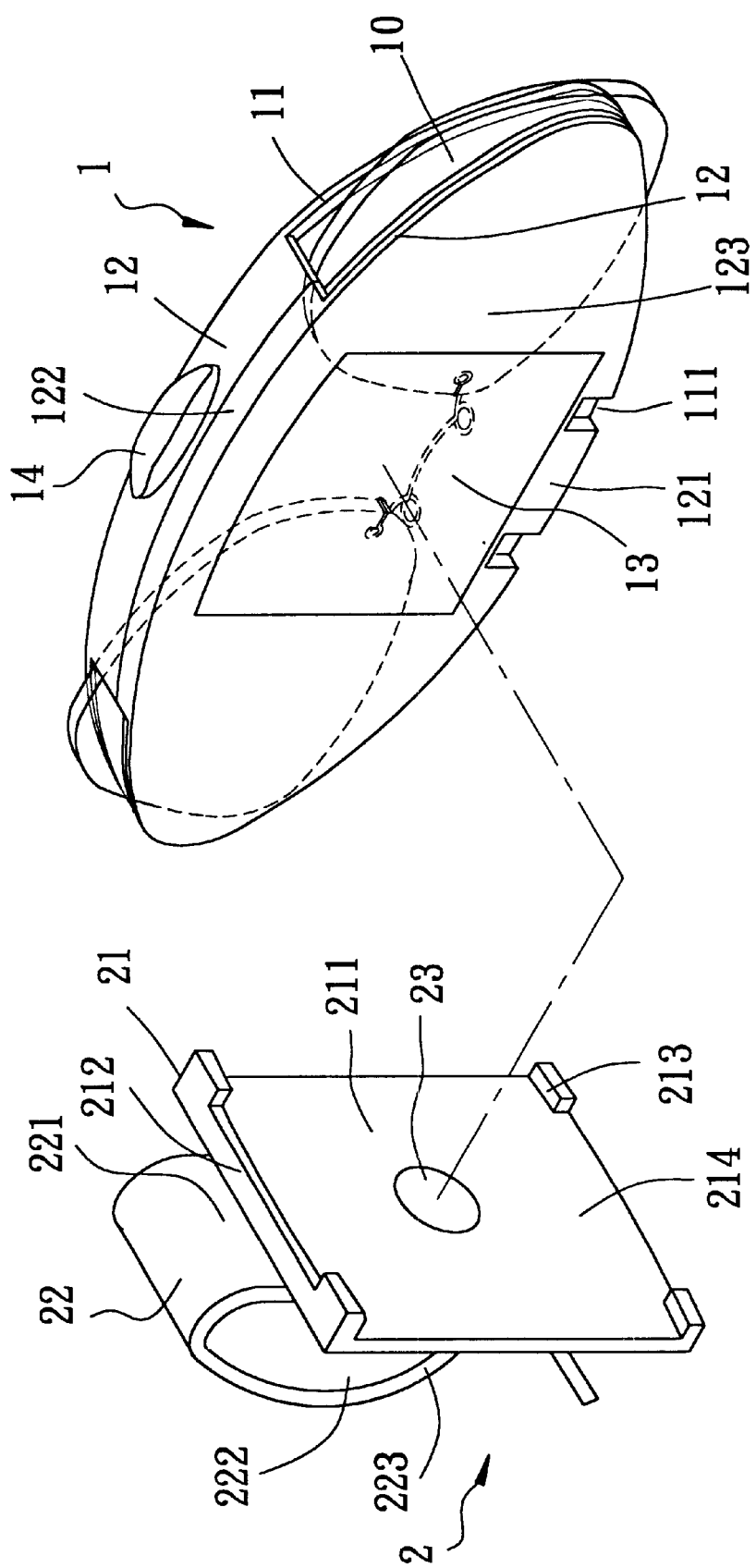
FIG. 1 is a partly exploded perspective view of a first preferred embodiment of an assembly of an eyeglass case and a case seat according to this invention.
Figure 2:
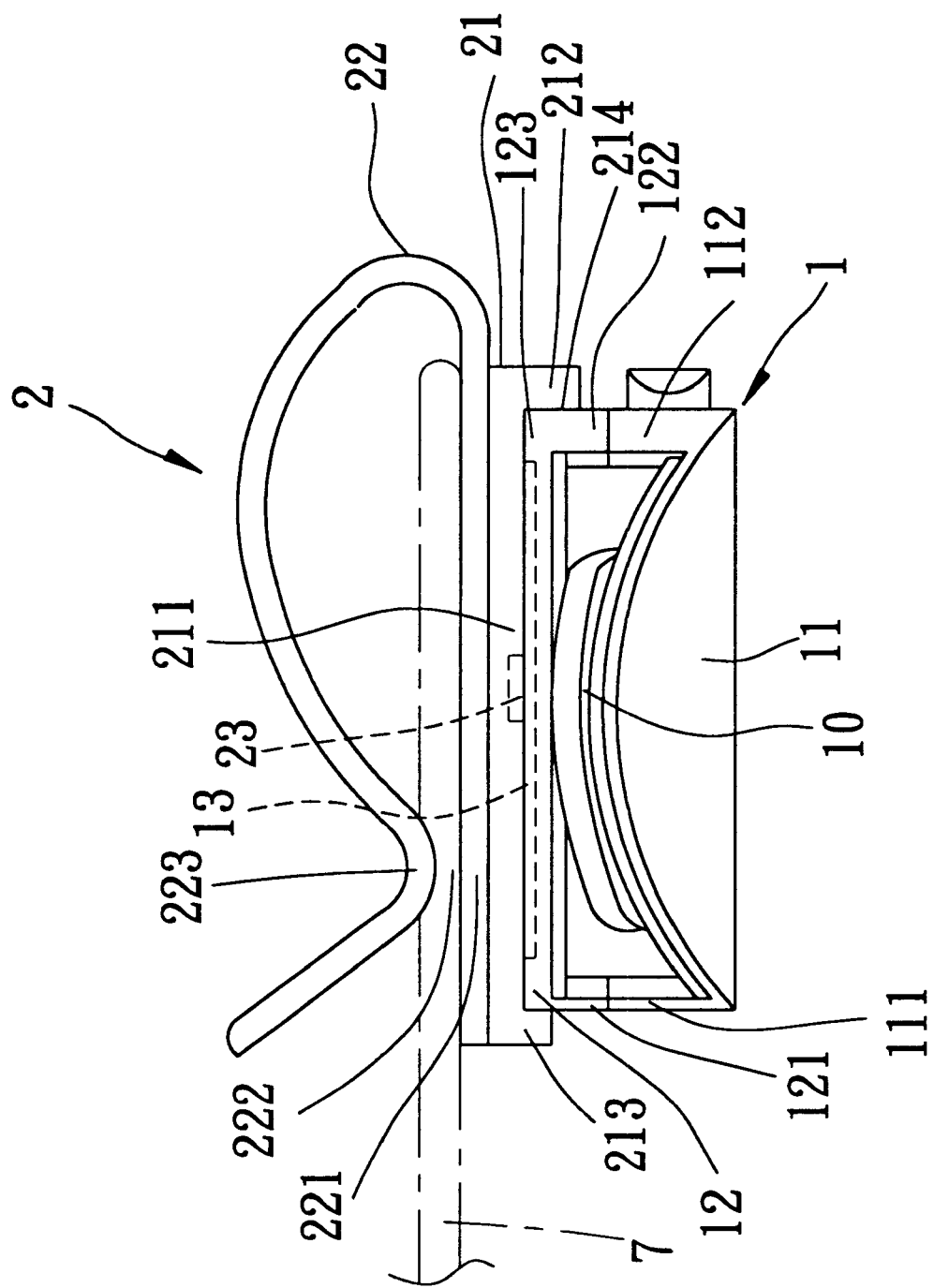
FIG. 2 is a side view of the first preferred embodiment.

Referring to FIGS. 1 and 2, a first preferred embodiment of an eyeglass case assembly according to this invention is shown to include an eyeglass case 1 that accommodates a pair of sunglasses 10 therein, and a unitary plastic case seat 2 that is mounted on a sun visor 7 in a car.

The eyeglass case 1 is elongated, and has two open ends, a front cover 11, a rear cover 12, and a first magnetic member 13. The front and rear covers 11, 12 have lower edges 111, 121 that are interconnected pivotally, and upper edges 112, 122 that are interconnected removably by a snap fitting unit 14. The rear cover 12 has a vertical rear surface or coupling portion 123. The first magnetic member 13 is fixed to a middle portion of the coupling portion 123, and is formed as a stainless steel plate. Alternatively, the first magnetic member 13 may be any other suitable magnetizable element. The eyeglass case 1 may be of any other suitable shape and structure. Because the shape and structure of the eyeglass case 1 is not pertinent to the features of this invention, further description thereof will be omitted herein for the sake of brevity. In this embodiment, the sunglasses 10 are a pair of auxiliary eyeglasses, which can be associated with a pair of primary eyeglasses (not shown) worn directly by a driver in the car.

The case seat 2 connects the eyeglass case 1 removably to the sun visor 7, and includes a seat body 21 and a clamping device 22. The seat body 21 has a vertical face 211 which is formed integrally with an upper abutment unit 212 and a lower abutment unit 213 that extend respectively and forwardly from upper and lower ends of the seat body 21 and that define therebetween a space 214 for accommodating the eyeglass case 1 therein. The eyeglass case 1 has upper and lower ends that abut respectively against the upper and lower abutment units 212, 213. The face 211 is provided with a second magnetic member 23 that is attached to a central portion thereof and that attracts magnetically with the first magnetic member 13, thereby fixing the eyeglass case 1 to the case seat 2. In this embodiment, the second magnetic member 23 is formed as a magnet. It is understood that as long as the first and second magnetic members 13, 23 can attract magnetically with each other, they can be made of any suitable materials. For example, the first magnetic member 13 can be a magnet, while the second magnetic member 23 can be a stainless steel plate.

The clamping device 22 is shaped as a clip plate which has a connecting portion 221 and a clamping portion 223. The connecting portion 221 is formed integrally with the upper end of the seat body 21. The clamping portion 223 extends integrally and downwardly from the connecting portion 221 so as to form a gap 222 between the clamping portion 223 and the seat body 21, which is adapted to clamp the sun visor 7 therewithin.

When it is desired to wear the eyeglasses 10, the driver pulls the eyeglass case 1 forcibly away from the case seat 2 against magnetic attractive force between the first and second magnetic members 13, 23 so as to take out the eyeglasses 10 from the eyeglass case 1. Because the eyeglass case 1 is attached to the case seat 2, which is fixed on the sun visor 7, it is easily accessible to the driver. When the driver gets off the car, the eyeglass case 1 can be taken away from the car with the case seat 2 remaining on the sun visor 7.

Figure 3:
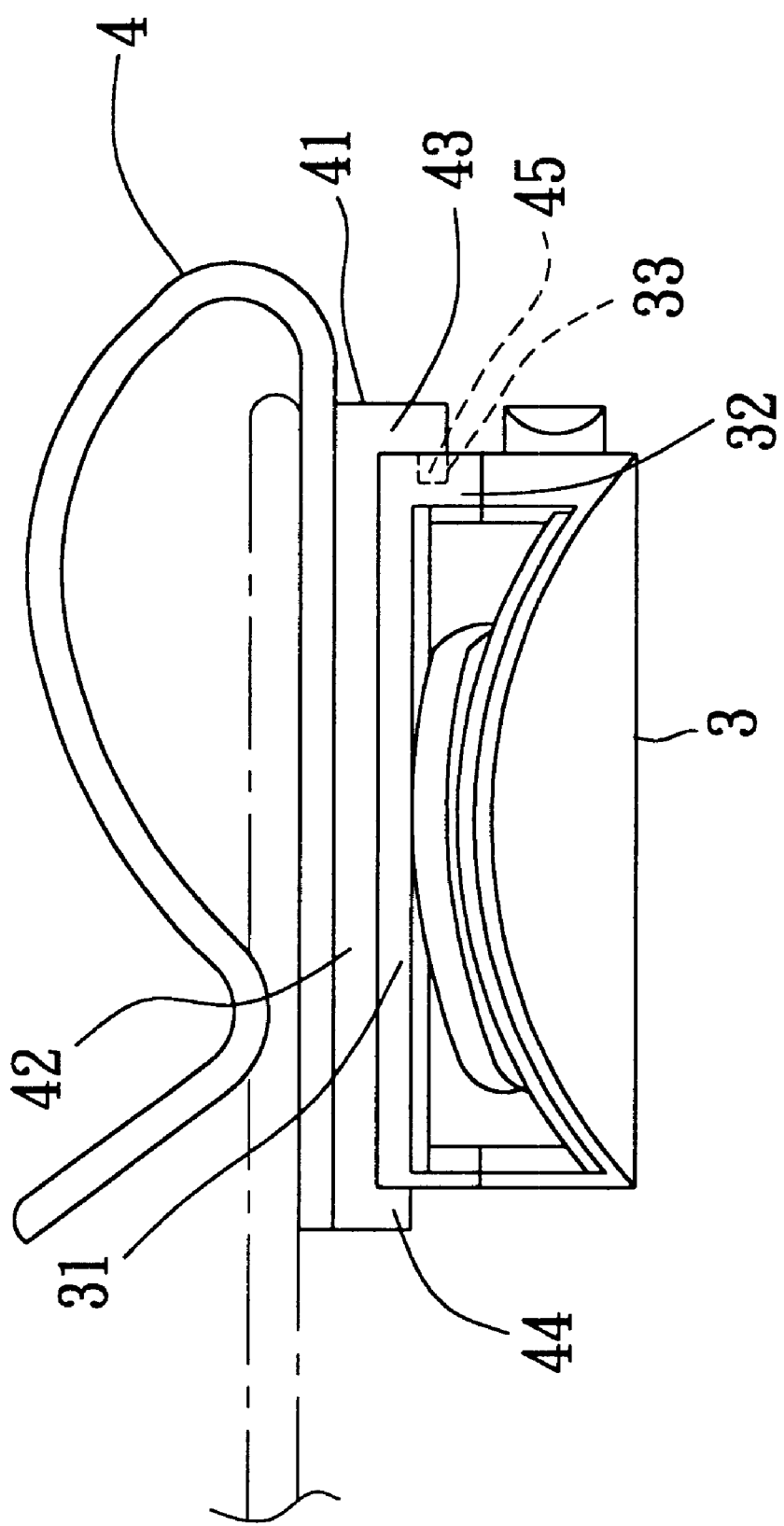
FIG. 3 is a side view of a second preferred embodiment of an assembly of an eyeglass case and a case seat according to this invention.

FIG. 3 shows a second preferred embodiment of this invention, which is generally similar to the first embodiment in construction and which includes an eyeglass case 3 with a rear cover 31, and a case seat 4 with a seat body 41. The seat body 41 has a vertical face that is formed integrally with an upper abutment unit 42, and a lower abutment unit 43. Unlike the first embodiment, the upper abutment unit 43 is formed with a downwardly extending integral tongue 45. The rear cover 31 of the eyeglass case 3 has an upper end 32 which is formed with a groove 33 that engages the tongue 45 of the upper abutment unit 43 of the case seat 4, thereby facilitating positioning of the eyeglass case 3 on the case seat 4.

Figure 4:
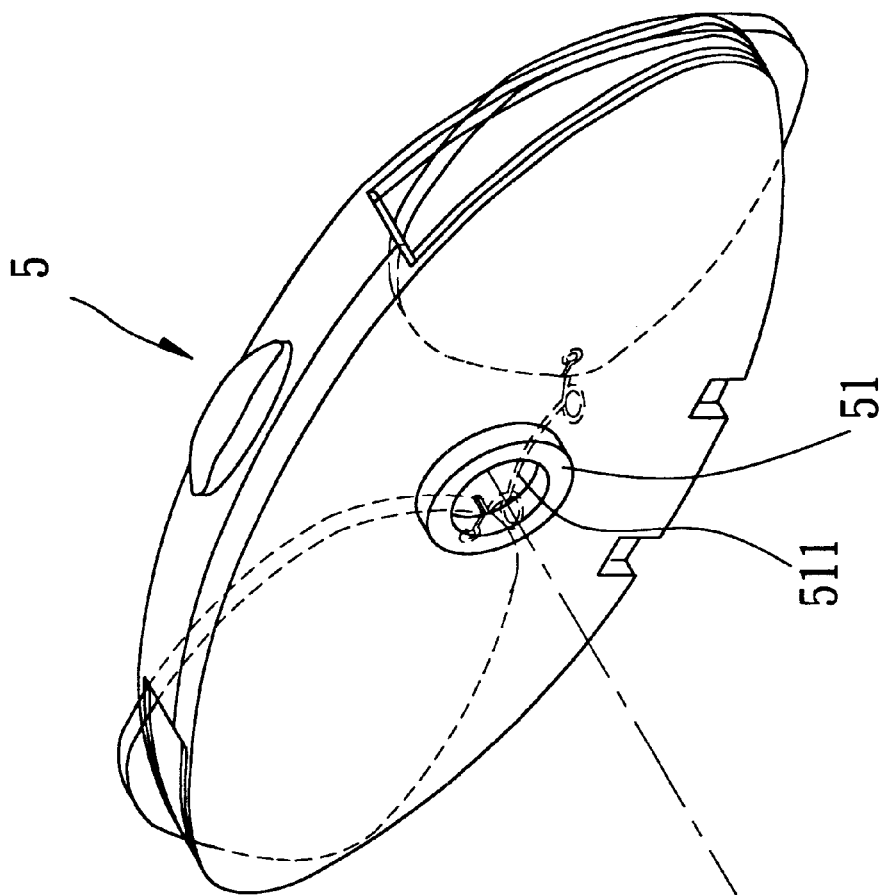
FIG. 4 is a partly exploded perspective view of a third preferred embodiment of an assembly of an eyeglass case and a case seat according to this invention.
Figure 4:
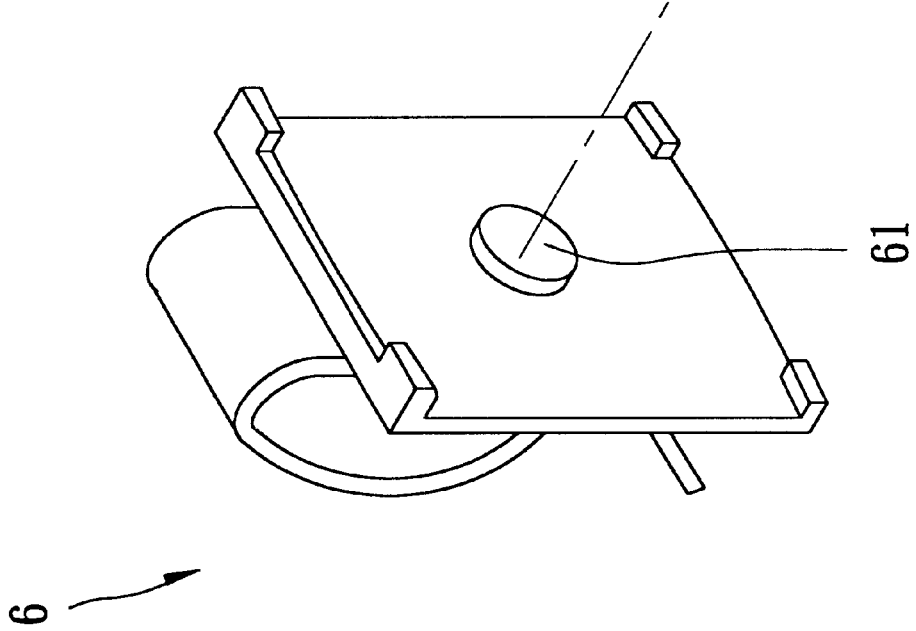

FIG. 4 shows a third preferred embodiment of this invention, which is generally similar to the first embodiment in construction except that the first magnetic member 51 of the eyeglass case 5 is shaped as a ring, which defines a central hole 511, while the second magnetic member 61 of the case seat 6 is shaped as a cylinder that engages fittingly the central hole 511 in the first magnetic member 51 of the eyeglass case 5.

Figure 5:
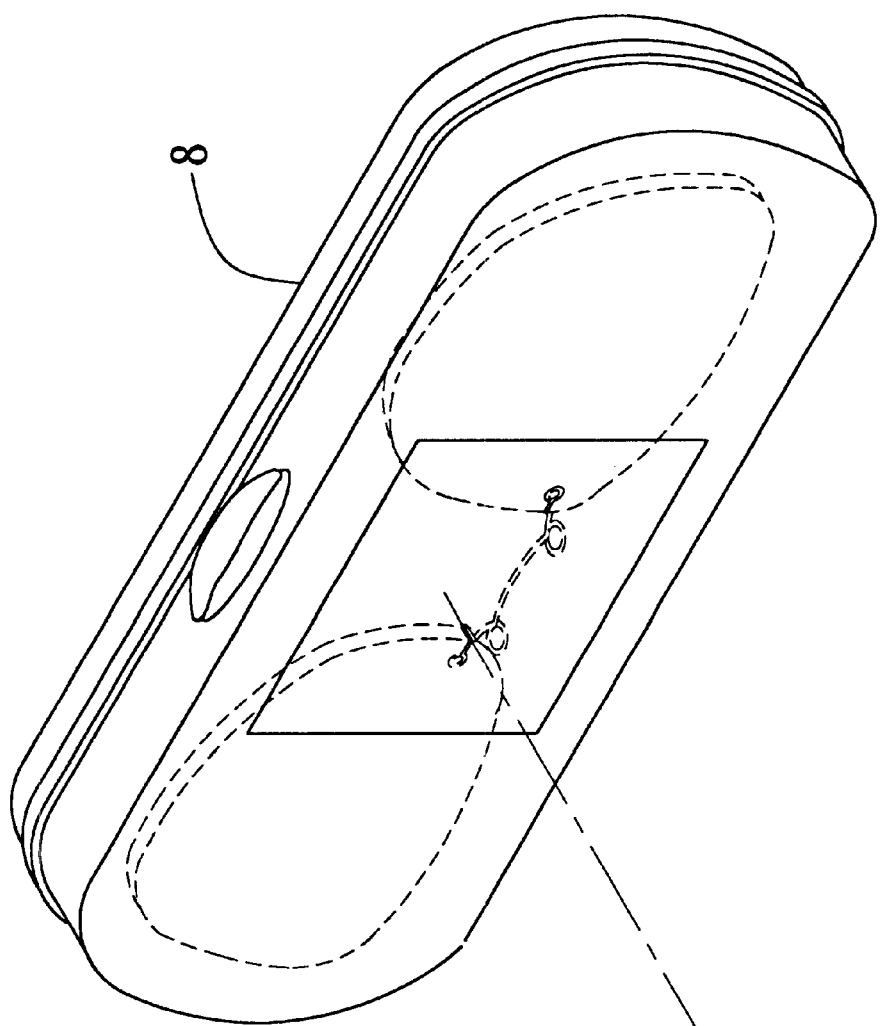
FIG. 5 is a partly exploded perspective view of a fourth preferred embodiment of an assembly of an eyeglass case and a case seat according to this invention.

FIG. 5 shows a fourth preferred embodiment of this invention, which includes an eyeglass case 8 and a case seat 9 that are generally similar to those of the first embodiment in construction except that the eyeglass case 8 is shaped as a sealed casing.

The assembly of this invention has the following advantages:

(1) The eyeglass case can be mounted conveniently, at a safe and easily accessible place in a car, such as on a sun visor, by means of the clamping device of the case seat.

(2) Because the eyeglass case is attached to the case seat by only the magnetic attractive force between the first and second magnetic members, the driver can remove the eyeglass case from the case seat with ease.

With this invention thus explained, it is apparent that numerous modifications and variations can be made without departing from the scope and spirit of this invention. It is therefore intended that this invention be limited only as indicated by the appended claims.

I claim:

1. An eyeglass case assembly comprising:

an eyeglass case having a coupling portion with a first magnetic member attached thereto; and a case seat having a face which is disposed adjacent to said coupling portion of said eyeglass case and which is provided with a second magnetic member that is attached thereto and that attracts magnetically with said first magnetic member, thereby fixing said eyeglass case to said case seat, said case seat further including a clamping device which is adapted to hold an article thereon, thereby mounting said case seat fixedly on the article.

2. The eyeglass case assembly as claimed in claim 1, wherein said case seat has a seat body, on which said face is formed, said face being vertical, said seat body including an upper abutment unit and a lower abutment unit, which extend respectively, integrally and forwardly from upper and lower ends thereof, said eyeglass case being disposed between said upper and lower abutment units and having an upper end that abuts against said upper abutment unit, and a lower end that abuts against said lower abutment unit.

3. The eyeglass case assembly as claimed in claim 2, wherein said upper abutment unit of said case seat is formed with a downwardly extending integral tongue, said upper end of said eyeglass case being formed with a groove which engages said tongue of said upper abutment unit, thereby facilitating positioning of said eyeglass case on said case seat.

4. The eyeglass case assembly as claimed in claim 2, wherein said clamping device is shaped as a clip plate which has a connecting portion that is formed integrally with said upper end of said seat body, and a clamping portion that extends integrally and downwardly from said connecting portion so as to form a gap between said clamping portion and said seat body, which is adapted to clamp the article therewithin.

5. The eyeglass case assembly as claimed in claim 1, wherein said first magnetic member is shaped as a ring which defines a central hole, said second magnetic member being shaped as a cylinder which engages fittingly said central hole in said first magnetic member.

6. The eyeglass case assembly as claimed in claim 1, wherein said eyeglass case is elongated, and has two open ends.

7. The eyeglass case assembly as claimed in claim 1, wherein said eyeglass case is shaped as a sealed casing.

8. The eyeglass case assembly as claimed in claim 1, wherein said first magnetic member is magnetizable.

9. The eyeglass case assembly as claimed in claim 8, wherein said first magnetic member is shaped as a stainless plate.

\* \* \* \* \*